United States Patent [19]

Turk

[11] 4,240,779
[45] Dec. 23, 1980

[54] APPARATUS FOR CUTTING AN EXTRUDED PRODUCT

[75] Inventor: Bartel G. Turk, Richmond, Ill.

[73] Assignee: The Quaker Oats Company, Chicago, Ill.

[21] Appl. No.: 935,930

[22] Filed: Aug. 23, 1978

Related U.S. Application Data

[63] Continuation of Ser. No. 627,760, Oct. 31, 1975, abandoned.

[51] Int. Cl.³ .............................................. A01J 21/02
[52] U.S. Cl. .................................. 425/313; 99/323.4; 241/82.7; 264/142; 425/377
[58] Field of Search ............... 425/377, 294, 297, 298, 425/301, 307, 306, 308, 311–313; 426/518; 241/82.7; 99/323.4

[56] References Cited

U.S. PATENT DOCUMENTS

| | | | |
|---|---|---|---|
| 2,096,529 | 10/1937 | Sizer | 425/313 |
| 2,401,236 | 5/1946 | Fielitz | 425/313 |
| 3,025,564 | 3/1962 | Voigt | 425/313 |
| 3,190,210 | 6/1965 | McComb et al. | 241/82.7 |
| 3,415,917 | 12/1968 | Watanabe et al. | 425/313 |
| 3,645,200 | 2/1972 | Craddock et al. | 425/307 |
| 3,753,637 | 8/1973 | Gasior et al. | 425/313 |
| 4,078,874 | 3/1978 | Lenhardt | 425/309 |

*Primary Examiner*—Jay H. Woo
*Attorney, Agent, or Firm*—Charles J. Hunter; Mathew R. P. Perrone, Jr.

[57] ABSTRACT

At least one knife on a cutting device for use with an extruder rotates to strike the extruded product with an upward motion to thereby force the product in a generally upward direction. The knife is encased in a vapor-permeable shroud having a size sufficient to prevent substantial striking of the shroud by the cut product.

2 Claims, 4 Drawing Figures

APPARATUS FOR CUTTING AN EXTRUDED PRODUCT

CROSS REFERENCE TO RELATED APPLICATION

This application is a continuation of application Ser. No. 627,760, filed Oct. 31, 1975, now abandoned.

BACKGROUND OF THE INVENTION

This invention relates to an apparatus for cutting an extruded product and more particularly to an apparatus for using the cutting action to force a cut extruded product in an upward direction to provide cooling and dissipation of heat through a vapor-permeable shroud surrounding the cutting edge and permit the product to be recovered without substantial deformation thereof.

A standard means known in the art for shaping a product is by use of an extruder. Basically, the extruder forces a mass of product through a die, and the product thus shaped by the die is recovered. In some cases, it is desired to recover small particles of an extruded material. This recovery of small particles is usually accomplished by providing a cutting device to cooperate with the die and force the cut extruded product down onto a conveyor belt. Due to the presence of the cutting device, a shroud is necessary to protect the operator of such a device from the cutting device. For many reasons this standard cutting operation is not suitable in a variety of extruding processes. For example, this cutting process is not suitable for extrusion of certain types of food exemplified by, but not limited to, cereals, snacks, and pet foods.

One reason that the standard cutting device is not suitable for many products—especially some food products—is that the standard safety device surrounding a cutting device is a solid shroud. The shroud is relatively small and designed primarily to cover the cutting edges of the cutting system to prevent access thereto while the cutting device is in operation. This shroud also traps heat if the extruded product has been heated. Yet a heated extruded product is standard in the food processing art for process ability and cooking purposes. This entrapment of heat causes steam and condensate build-up inside the shroud. Furthermore, the small size of the shroud leads to contact of the extruded food products with the shroud to such an extent that the food product is deprived of the desirable form for the product.

In order to avoid contact with the shroud, a cutting system is customarily arranged to throw the cut product in a downward direction so that the product contacts a suitable removing device such as a conveyor belt. This conveyor belt concept also causes problems in the food processing area. The particles of food contact the conveyor belt at relatively high velocity resulting in deforming of the product. The high velocity results from both gravitational force and the downward momentum imparted to the food particle by the downward stroke of the cutter which is added to the gravitational force. These forces plus the short time between cutting and belt contact can result in product deformation— especially because the product is still warm from the extruder and has insufficient time to dry. Also, clumping of the product may occur if the belt is not moved fast enough to avoid the contact between the various pieces of the product, because the product is coming down so fast that intra piece contact is almost inevitable. Yet, this contact is sometimes unavoidable because of the small shroud and the desirability of focusing the product on a certain area in order to provide the necessary protection for the operator from the cutting device. This fast running of the conveyor belt to avoid the clumping is not always effective and does not minimize the contact with the belt which can also cause product deformation. Accordingly, the solution to the protection of the cutting system and removal of the product from the extruder creates a substantial number of problems which interfers with an efficient system of recovering the products.

Various corrections are possible to solve the above-referenced problems. It is possible to use a cooler extrusion temperature. However, this cooler extrusion temperature has an effect on a food product in that the product cannot be as thoroughly cooked within the extruder and can change product characteristics. It is also possible to reduce the moisture content of the extruded product to avoid the steam build-up when the product exits from the extruder. This moisture reduction, however, inhibits the proper flow of the extrudate within the extruder and adversely affects the appearance and texture of the food. Accordingly, the recovery of the product from the extruder presents a substantial number of problems which interfere with efficient extruder production. When one product problem is corrected, another problem is created which compounds the extrusion problem. Accordingly, it is desired to provide a cutting system and process which permits the recovery of the product from an extruder while avoiding the problems of the prior art.

SUMMARY OF THE INVENTION

Therefore, it is an object of this invention to provide an improved apparatus which dissipates steam buildup at product recovery.

It is a further object of this invention to provide an improved cutting apparatus which minimizes deforming of the product.

It is a still further object of this invention to provide an improved cutting apparatus which avoids clumping of the product.

Yet a further object of this invention is to provide an improved cutting apparatus which minimizes intra-product contact during recovery of the extruded product.

Yet another object of this invention is to provide an improved apparatus which permits a maintained extrusion temperature.

Still another object of this invention is to provide an improved apparatus which provides for proper flow of the extrudate within the extruder without undue moisture reduction.

These and other objects of this invention are met by providing a cutting device for use with an extrusion apparatus which has an upward cutting stroke to thereby throw the cut product in a generally upward direction. The cutting device is generally encased with a vapor-permeable shroud to offer protection to machine operators, and product direction to an appropriate recovery device and yet allow dissipation of heat and moisture.

Figure 1:
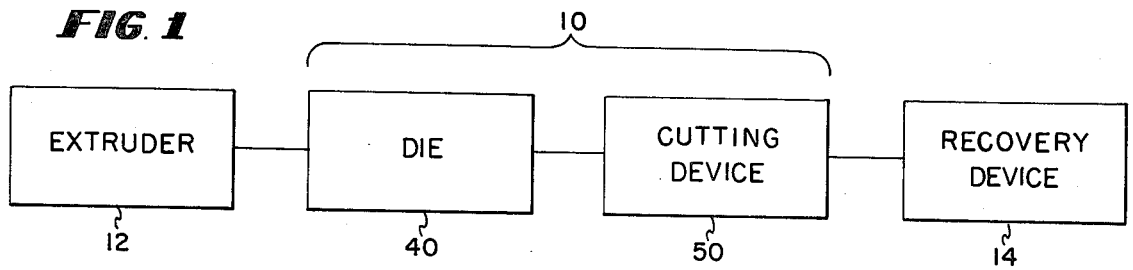
FIG. 1 depicts a block diagram of the food shaping device 10

Other objects and many of the attendant advantages of this invention are readily apparent as the same becomes better understood by reference to the following detailed description when considered in connection with the accompanying drawings in which like reference numerals designate like parts throughout the figures thereof.

DESCRIPTION OF THE PREFERRED EMBODIMENTS

An extrusion device is improved by combining therewith a cutting device which tends to throw the product in an upward direction and recovering the product thus cut.

The food shaping device 10 generally shown in block diagram form in FIG. 1 comprises an extruder 12 having a cutting and shaping device 20 mounted on the extruder 12 through which an extrudate forced through the extruder 12 must pass. Cutting and shaping device 20 comprises a die 40, and cutting device 50 flush with the die 40. After the extrudate is cut by cutting device 50, the extrudate goes to recovery device 14. In this fashion FIG. 1 is a general description of the process.

Figure 2:
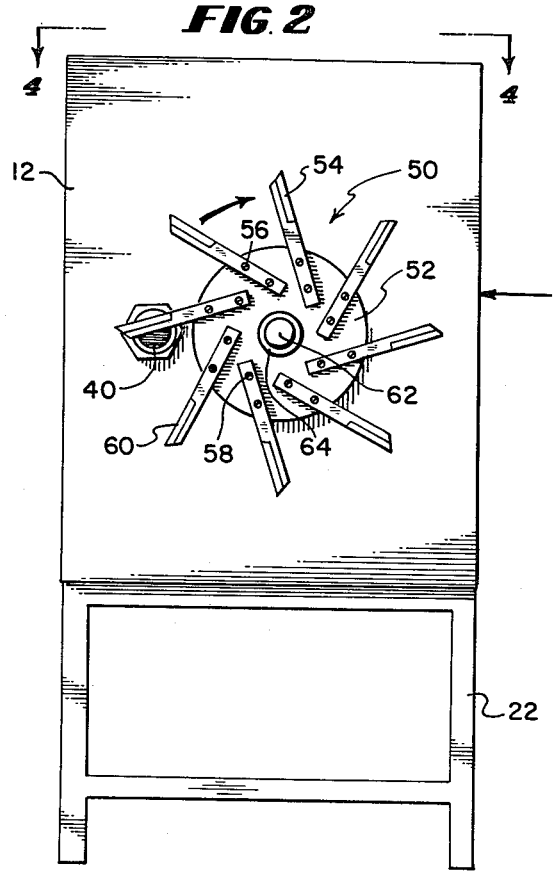
FIG. 2 depicts cutting and shaping device 20 from a front view 30.

FIG. 2 is a front view 30 of cutting and shaping device 20. The extruder 12 is of any suitable type. Therefore, cutting and shaping device 20 is generally depicted in FIG. 2 as being mounted on stand 22 in communication with extruder 12. Threadably secured to cutting and shaping device 20 is die 40, from extruder 12, and cutting and shaping device 20 through die 40 passes the extrudate to be cut by cutting device 50. Cutting device 50 is depicted in FIG. 2 as having a clockwise rotation in order to provide an upward momentum to extrudate coming out of die 40. Cutting device 50 generally comprises plate 52. Plate 52 may be circular as shown in the FIG. 2 or of any suitable shape permitting the function of the cutting device 50. Secured to plate 52 are eight blades 54 by means of a first screw 56 and a second screw 58. The first screw 56 and the second screw 58 in each blades 54 passed through the blades 54 and are in threaded relation with the plate 52 to thereby secure blades 54 to plate 52. Blades 54 have a cutting edge 60 that contacts the extrudate exuding from die 40 with an upward stroke. While eight blades 54 are shown, other numbers of blades are also suitable for use. An appropriate number of blades or a blade is easily determined by standard means. The position of blades 54 governs the upward direction of the cut extruded material. The position of blades 54 is easily adjusted by maneuvering second screw 58. This factor changes the upward direction of the cut extrudate. Cutting device 50 is fixedly mounted by standard bolt device (not shown) or other suitable means on a rotatable axle 62 by means of a bolt 64. Cutting device 50 is secured to rotatable axle 62 such that on clockwise rotation of cutting device 50 the blades 54 contact the extrudate exuding from die 40 to impart an upward motion to cut the extrudate. Axle 62 is rotated in the clockwise direction to thereby move cutting device 50 in the same direction by means of an electric motor or other suitable device not shown. The clockwise rotation is essential to achieve the upward flow of the extrudate. If the cutting device 50 were positioned to the left of die 40 in FIG. 2 a counter clockwise rotation is required.

Figure 3:
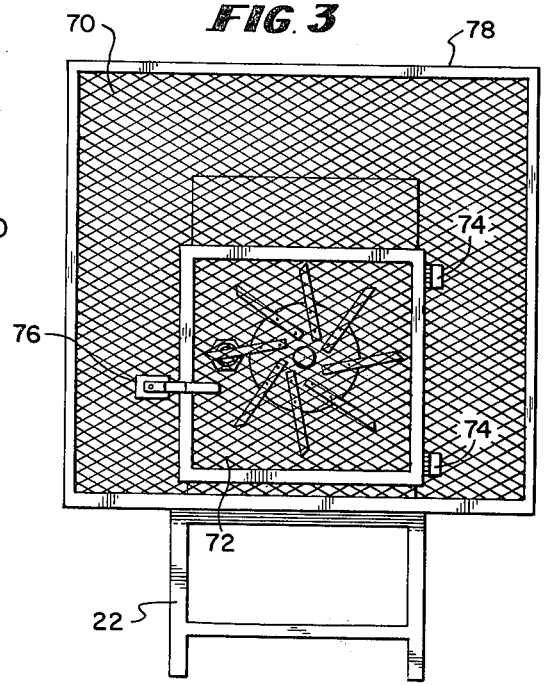
FIG. 3 is a depiction of FIG. 2 including a shroud generally shown at 70.

In FIG. 3, a shroud 70 made of a metal mesh or other suitable vapor permeable material encloses cutting device 50 and die 40 as it is bolted or secured in another standard fashion to the front of cutting and shaping device 20. Shroud 70 serves as a safety device protecting machine operators from cutting device 50 when the cutting device is in operation. Shroud 70 also serves as a means for dissipating the heat and released moisture present in the extrudate as it exits frm the die 40 by way of extruder 12. Shroud 70 further serves to direct the cut extrudate to a recovery device 14 (not shown in FIG. 3) should the cut extrudate be imparted with a momentum sufficient to exceed the limits of the recovery device. However, shroud 70 is sufficiently large so that the cut extrudate has sufficient time to move and cool in the air in order to avoid deforming of the extrudate should the cut extrudate contact the shroud or other solid.

Shroud 70 is of sufficient size to allow the cut product to be thrown upward such that the product may cool, harden or lose upward velocity sufficiently so that if the cut product strikes shroud 70, deformation of the product is minimized or eliminated entirely. The appropriate shroud size is easily adjusted by a person having ordinary skill in the art after the person having ordinary skill in the art has considered the instant application. Generally the volume of the shroud 70 is up to about 1 cubic meter with a top 78 of shroud being up to about 2 meters from die 40.

Shroud 70 can be fabricated from any suitable vapor-permeable material. Especially suitable vapor-permeable material includes expanded metal or a metal screen. For a metal screen, almost any mesh size is suitable. However, it is especially desirable that the mesh size be small enough so that the operator of food shaping device 10 may not put his fingers through the screen and cannot contact blades 54, and so that the food particles cannot pass therethrough. Accordingly, the mesh has a suitable area of up to about one square centimeter. Similar features are also applicable to expanded metal.

The shroud 70 generally forms part of the cutting device 50 and directs product to recovery device 14. A suitable recovery device 14 may be a conveyor belt (not shown) mounted below the shroud 70 and adjacent the extruder 12. In order to facilitate access to the cutting device 50 and changing of the die 40, shroud 70 is provided with a door 72 held in place by hinges 74 and a latch 76.

Figure 4:
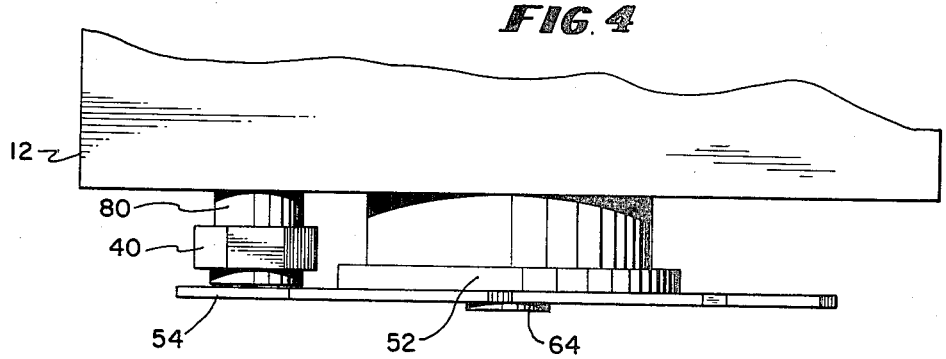
FIG. 4 is a top view of FIG. 2 along line 4—4.

FIG. 4 depicts a top view of FIG. 2 showing the cutting and shaping device 20 having die 40 threadably attached thereto at outlet 80 of cutting and shaping device 20 and cutting device 50 positioned so that blades 54 contact die 40 as the cutting device 50 rotates in a clockwise direction when powered by an electric motor (not shown) or other suitable device.

The apparatus above described solves a difficult problem in the food processing art. They provide a means for simplifying the recovery of an extrudate without requiring substantial modification of the extrudate or of the machinery used to form the extrudate. Several problems, which have plagued the industry for a long period of time, are solved by this invention. The problem is one of obtaining a uniformly shaped product. Past processes result in clumping and deformation when the product strikes a recovery means. The analysis which lead to this invention considers the need of the extruded product to cool and dry as it is being extruded. The analysis further leads to the conclusion that drying in air at room temperature and cooling under the same conditions is the least expensive and most efficient way to achieve the desired results of maintaining a suitable shape for the product. The problem thus becomes how to maximize the advantages of using the room air temperature to achieve the desired goals. This invention meets those goals. This invention suspends the product in air at room temperature for a substantially longer period of time than do the prior art processes. By suspending the product in air, the time to cool and dissipate released moisture is greatly increased. Therefore, when the product eventually strikes either the shroud 70 or other solid surface, it has sufficiently cooled to achieve the desired stability and prevent deformation of the product. This invention also allows the cut product to fall gently onto a conveyor belt rather than thrown down onto it at high velocity above that normally imparted by gravity. At the same time the vapor-permeable shroud allows the heat and evaporated moisture to be easily dissipated away from the cutting and shaping device, which eliminates the formation of any condensation within the shroud. If further cooling is required the shroud allows cooling air or gas to be directed at the product immediately upon exiting from the extruder whereas a solid shroud blocks any such cooling attempt. Accordingly, at least two major problems of the prior art are solved.

Obviously many modifications and variations of the present invention are possible in light of the above teachings. It is, therefore, to be understood that, within the scope of the appended claims, the invention may be practiced otherwise than is specifically described.

In the following example which is intended to illustrate without unduly limiting the invention, all parts and percentages are by weight unless otherwise specified.

EXAMPLE

A dough is formulated as in the Example of U.S. Pat. No. 3,741,774 to Burkwall. The dough is then extruded through an exterior having a cutting and shaping device 20 such that the cut extrudate is thrown in an upward direction. Shroud 70 having a volume of at least ½ cubic meter surrounds and protects cutting device 50. This shroud 70 is large enough so that the product has cooled substantially on its upward flight. If some of the product does contact the shroud it is cooled sufficiently and lost a sufficient amount of moisture so that the product is not deformed on contact with the shroud. It has also lost its initial high velocity, so any contact does not cause any deformation. The product then falls by mere gravitational flow onto a conveyor of a standard type with no additional momentum. The conveyor then conveys the product to a packaging device thereby combining with the shroud, the conveyor and the packaging device to form a complete recovery device 14 as shown in FIG. 1. The resulting product is spread out more widely on the conveyor belt and exhibits less clumping then if the product were extruded in a standard extruder having a standard counter clockwise rotating cutting device which throws the product in a downward direction in a narrow band onto the conveyor. Additionally, the larger shroud dissipates the heat and steam from the extruded product as opposed to a conventional smaller non vapor-permeable shroud.

Having thus fully disclosed and claimed the invention, what is sought to be claimed and secured by Letters Patent is:

1. In a shaping device comprising an extruder means, a cutting means and a recovery means; the extruder means cooperating with the cutting means to transfer a heated, extruded food product to the recovery means, the improvement comprising:

I. a cutting means consisting essentially of a rotatable plate to serve as a base for at least one blade:
   (a) said blade having a first end and a second end and being secured to said plate at the first end of said blade;
   (b) the second end of said blade comprising a cutting edge and extending beyond an edge of said plate;
   (c) said cutting edge rotatabley and movably positioned in slideable contact with an outlet of said extruder means said outlet being substantially horizontal; and
   (d) said cutting edge having a substantially upward stroke in relation to said outlet, said cutting edge and said outlet cooperating so that all of the extruded product is thrown in an upward direction upon cutting, said upward direction providing time for said cut product to cool; and II. an enlarged vapor permeable shroud communicating with and surrounding said rotatable plate and said at least one blade, and also communicating with atmospheric air; to thereby contain said product on said upward flight in said air and direct said product to said recovery means while permitting dissipation of heat and evaporated moisture directly into said air.

2. The shaping device of claim 1 wherein a plurality of said blades are secured to said plate.

* * * * *